United States Patent Office 3,143,147
Patented Aug. 4, 1964

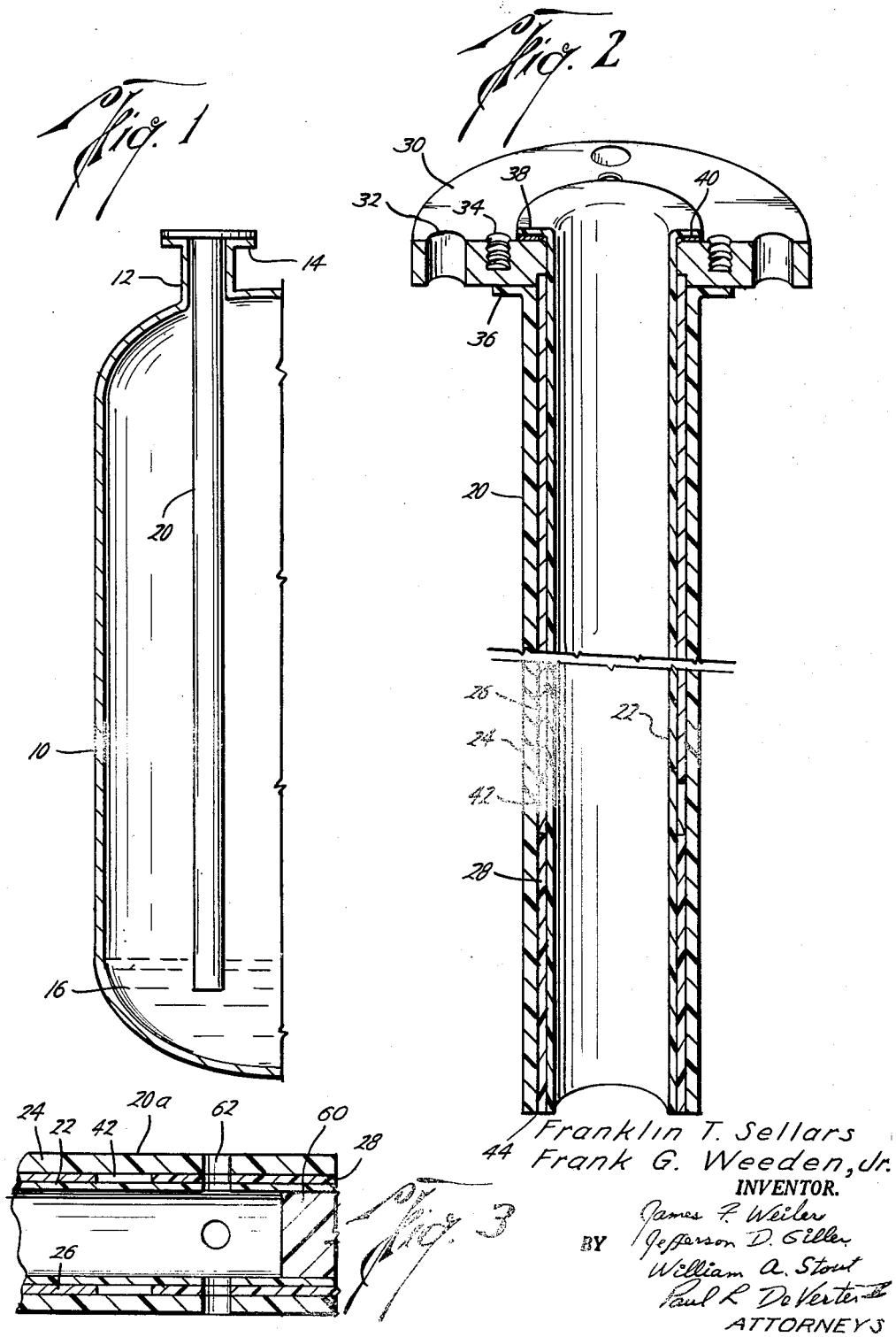

3,143,147
DIP TUBE
Franklin T. Sellars and Frank G. Weeden, Jr., Houston, Tex., assignors to John L. Doré Co., Houston, Tex., a corporation of Texas
Filed Sept. 8, 1961, Ser. No. 136,932
3 Claims. (Cl. 138—140)

The present invention relates to an improved dip tube for use in inserting or withdrawing corrosive and/or eroding material from a container.

Dip tubes, which are also variously called sparger tubes, dip pipes, and blow legs, are generally well known in the materials handling art as a means for loading and unloading containers such as tanks, agitators, mixing vats, and the like. Likewise, specific forms have been devised for use in handling corrosive materials having acid and alkaline characteristics. These tubes, as well as the containers, are typically sheathed with a substance which is relatively inert in the presence of the material being handled, an example of such a substance being vitreous glass enamel. Unfortunately, these tubes have not proven to be entirely satisfactory due to the tendency of the sheath to chip, scale, assimilate into the material handled, or develop pin holes, all of which will result in impurities and the consequent spoiling of the batch or run.

It is therefore an object of the present invention to provide an improved dip tube which is sheathed so as not to chip, scale, assimilate, nor develop pin holes.

Such a dip tube might, of course, be made entirely of an inert substance having the requisite properties, and an example of such a substance is Teflon, a polymerized tetrafluoroethylene resin.

However, as with most plastics, although the requisite chemical properties are present, the requisite physical properties are not. To make a tube entirely of Teflon, for universal application in existing containers, would require the use of an undesirably large tube so that it would be rigid enough not to be deflected by fluid currents into an agitator, for example. This problem has been solved by making short tubes. The present invention makes possible the use of longer tubes by providing a means for reinforcing the tube without the possibility of contamination or deflection.

Thus, another object of the present invention is to provide an improved dip tube which is reinforced and relatively rigid.

Finally, the remaining problem has been to make a reinforced dip tube which will not develop cracks, splits, and the like due to the difference in thermal expansion of the reinforcing means and the inert sheath. The present invention solves the problem of differing thermal expansion by providing an air gap so that the reinforcing means may expand and contract without fear of cracking or splitting the sheath.

Another object is to provide a reinforced dip tube in which provision is made for differences in the thermal expansion characteristics of the reinforcing means and the sheath.

A further object is to provide a dip tube which may be readily substituted for existing tubes, made in any desired length, easily fabricated, and economically feasible.

Other and further objects, features, and advantages will be apparent from the following description of a presently preferred embodiment of the invention given for the purpose of disclosure, and taken in conjunction with the accompanying drawings, where like character references designate like parts throughout the several views, and where:

FIGURE 1 is an elevational view, partially in section, of a container with the present invention inserted therein, FIGURE 2 is a partial sectional view, in perspective, of the invention embodied as a dip tube, and FIGURE 3 is a partial sectional perspective view of a presently preferred embodiment of the invention as a sparger tube.

Referring now to the drawings, and particularly FIGURE 1, the reference numeral 10 generally designates a container having the usual nozzle 12 and flange 14 thereon. Such a container 10, when used for corrosive material 16 is ordinarily coated on its interior with fused glass (not shown) which extends through the nozzle 12 and over the top surface of the flange 14. Obviously other coatings may be used, all being within the skill of the art. The present invention is therein depicted as a dip tube 20 inserted through the nozzle 12 into the container 10.

As seen in FIGURE 2, the dip tube 20 generally includes an inner sheath 22, an outer sheath 24, reinforcing means 26, and a relatively short middle sheath or filler member 28. The reinforcing means 26 may consist of a steel pipe or other rigid tubing. A pipe flange 30 is attached to one end of the reinforcing means 26 in a conventional manner, as by welding. The flange 30 may have bolt holes 32 for attaching to the container flange 14, but other conventional fastening devices may be utilized. The flange 30 is also shown with blind threaded holes 34 so that additional piping may be secured to the dip tube 20 and thereby to the container 10.

The outer sheath 24 extends from below and around the reinforcing means 26 to the flange 30, where an outer flange 36 is formed thereon. This outer flange 36 serves as a gasket between the container flange 14, or the coating on flange 14, and the pipe flange 30, thus preventing contact of the corrosive material 16 and the pipe flange 30 or the reinforcing means 26 attached thereto.

The inner sheath 22 likewise extends from the same point as the outer sheath 24 (i.e. below the reinforcing means 26) within the reinforcing means 26 to the pipe flange 30, where an inner flange 38 is formed thereon. This inner flange 38 serves as a gasket between the pipe flange 30 and any piping which may be attached to the dip tube 20. Between the pipe flange 30 and the inner flange 38 may be placed a conventional asbestos filler gasket 40; this has sometimes been found useful when a cold flowing plastic is used for the inner flange 38.

Between the inner sheath 22 and outer sheath 24, and below the reinforcing means 26 is inserted a middle sheath or filler member 28. The inner diameter of the middle sheath 28 should approximate that of the outer diameter of the inner sheath 22, and the outer diameter of the middle sheath 28 should approximate that of the inner diameter of the outer sheath 24. The bottom of the middle sheath 28 should correspond with that of the inner and outer sheaths 22 and 24. The top of the middle sheath 28 is spaced from the reinforcing means 26 so as to leave an expansion gap 42. This gap 42 provides space into which the reinforcing means 26 may expand should the coefficient of thermal expansion thereof be greater than that of sheaths 22, 24, and 28. Contrariwise, the gap 42 provides space for the thermal contraction of the sheaths.

The inner, middle, and outer sheaths 22, 24 and 28 are fused together where they coincide or at least at their respective bottoms 44 so that the corrosive material 16 cannot reach the reinforcing means 26. One method of doing this is by sintering, which is the application of heat and pressure resulting in fusion.

The sheaths may be made of almost any suitable material which is inert in the presence of the corrosive material being handled and which may be fused together to prevent leakage. Other desirable characteristics include the ability not to chip, scale, nor develop pin holes. Several modern commercial plastics have all of the properties, and the one presently preferred is tetrafluoroethylene resin, well known by the trade name Teflon. Although the reinforcing means and sheaths are depicted as straight circular sections, it is obvious that other shapes are within the skill of the art, such as a curved triangular section.

The method of manufacturing a dip tube 20 involves the steps of forming a retaining means, such as the pipe flange 30 on a reinforcing means 26. Next, an outer sheath 24 having an outer flange 36 is slipped over the reinforcing means 26; and an inner sheath 22 having an inner flange 38 is slipped within the reinforcing means 26. If desired a filler gasket 40 may be placed between the inner flange 38 and the pipe flange 30. A middle sheath 28 is slipped between the inner and outer sheaths 22 and 24, leaving an air gap 42. Finally the sheaths are fused together forming an impenetrable bond.

In use, the dip tube 20 is inserted through the nozzle 12 into the container 10 and conventionally fastened thereto, with the outer flange 36 acting as a gasket between the pipe flange 30 and the container flange 14. Suitable piping is attached to the top of the pipe flange 30 with the inner flange 38 acting as a gasket therebetween. The dip tube 20 is then ready to be used in filling, empyting, adding to, or subtracting from the material 16 within the container 10.

The material 16 has been described as being of a corrosive nature, acid or alkaline. However, the term is meant to include all materials which would be contaminated under operating circumstances by contact with the reinforcing means 26 but not by the sheaths 22, 24, and 28.

A variation of the present invention is shown in FIGURE 3. Technically, a sparger tube is a form of a dip tube, the only difference being in the end configuration. The sparger tube 20a of FIGURE 3 includes the same parts and properties of the dip tube 20, with the additional elements of a plug 60 and ports 62. The plug 60 has an outer diameter equal to that of the inner diameter of the inner sheath 22. The plug 60 is fused to the inner sheath 22. Intake and discharge ports 62 for the sparger tube 20a are provided by drilling conventional holes radially about the bottom end. These ports 62 are drilled through the concurrent junction of the outer sheath 24, middle sheath 28 and inner sheath 22. In this manner the corrosive material 16 cannot reach the reinforcing means 26. Care must be taken to assure proper fusing of the sheaths above the ports 62 so that the liquid 16 cannot be contaminated by the reinforcing means 26.

Thus it is seen that the dip tube of the present invention will withstand corrosive liquids, and as reinforced will be substantially rigid, and can be made in any desired length. Further, the present invention will withstand large changes in temperature, and is not fragile.

The present invention, therefore, is well adapted to carry out the objects and attain the ends and advantages mentioned as well as others inherent therein. While a presently preferred embodiment of the invention is given for the purpose of disclosure, numerous changes in the details of construction, arrangement of parts, and steps of the process may be made which will readily suggest themselves to those skilled in the art and which are encompassed within the spirit of the invention and the scope of the appended claims.

What is claimed is:
1. A dip tube for containers comprising:
an elongate metal tubular reinforcing means having first and second ends,
an outwardly extending mounting flange attached to the reinforcing means at the second end thereof,
an inner plastic sheath readily slidably mounted on said reinforcing means and extending from said mounting flange through said reinforcing means and extending beyond the first end thereof,
said inner sheath including an inner flange concentric with and abutting said mounting flange,
an outer plastic sheath readily slidably mounted on said reinforcing means and extending from the mounting flange around said reinforcing means and extending beyond the first end thereof,
said outer sheath including an outer flange concentric with and abutting said mounting flange,
a middle plastic filler member having a cross section substantially the same as the cross section of the reinforcing means mounted between the extensions of the inner and outer sheaths and fused throughout its length thereto,
said middle member being spaced from the first end of said reinforcing means, thereby providing a gap for thermal expansion of said reinforcing means and thermal contraction of the sheaths and middle member,
said sheaths and middle member being of the same plastic material, and
said reinforcing means having a different rate of thermal expansion than said sheaths and middle filler member.
2. The invention of claim 1 including:
a plug fused throughout its length to said inner sheath at the first end thereof,
said plug being of the same material as said sheaths, and
said sheaths and middle member having ports therethrough in the extensions of said sheaths beyond said reinforcing means and gap, providing fluid communication between the interior and exterior of said dip tube.
3. The invention of claim 1 wherein:
said sheaths and middle member are of Teflon, and said reinforcing means is of steel.

References Cited in the file of this patent
UNITED STATES PATENTS

| | | |
|---|---|---|
| 1,467,563 | Armstrong | Sept. 11, 1923 |
| 2,347,123 | Riesgo | Apr. 18, 1944 |
| 2,535,437 | McCann | Dec. 26, 1950 |
| 2,674,297 | Greenwald | Apr. 6, 1954 |
| 2,713,885 | McKinley | July 26, 1955 |
| 2,753,893 | Brown | July 10, 1956 |
| 2,907,103 | Lewis et al. | Oct. 6, 1959 |
| 2,961,345 | Petriello | Nov. 22, 1960 |
| 2,976,889 | Cannady | Mar. 28, 1961 |
| 2,991,808 | Siegmann et al. | July 11, 1961 |
| 3,002,534 | Nolan | Oct. 3, 1961 |
| 3,030,253 | St. John et al. | Apr. 17, 1962 |
| 3,050,786 | St. John et al. | Aug. 28, 1962 |
| 3,085,438 | St. John et al. | Apr. 16, 1963 |

FOREIGN PATENTS

| | | |
|---|---|---|
| 399,189 | Great Britain | Sept. 21, 1933 |
| 848,608 | Great Britain | Sept. 21, 1960 |